(12) United States Patent
Han et al.

(10) Patent No.: US 11,573,416 B2
(45) Date of Patent: Feb. 7, 2023

(54) RECIRCULATING PROGRAMMABLE PHOTONIC CIRCUITS AND OPERATING METHOD THEREOF

(71) Applicants: DAEGU GYEONGBUK INSTITUTE OF SCIENCE AND TECHNOLOGY, Daegu (KR); KOREA ADVANCED INSTITUTE OF SCIENCE AND TECHNOLOGY, Daejeon (KR)

(72) Inventors: Sangyoon Han, Daegu (KR); Kyoung Sik Yu, Daejeon (KR)

(73) Assignees: Daegu Gyeongbuk Institute of Science and Technology, Daegu (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 17/556,010

(22) Filed: Dec. 20, 2021

(65) Prior Publication Data

US 2022/0197012 A1    Jun. 23, 2022

(30) Foreign Application Priority Data

Dec. 22, 2020   (KR) .................. 10-2020-0181419
Oct. 1, 2021    (KR) .................. 10-2021-0130530

(51) Int. Cl.
*G02B 26/06*  (2006.01)
*G02B 6/26*   (2006.01)

(52) U.S. Cl.
CPC ............... *G02B 26/06* (2013.01); *G02B 6/26* (2013.01)

(58) Field of Classification Search
None
See application file for complete search history.

(56) References Cited

U.S. PATENT DOCUMENTS

| 7,450,812 B2 * | 11/2008 | Romo ................. G02B 6/3586 385/23 |
| 10,763,974 B2 | 9/2020 | Bunandar et al. |
| 2018/0306976 A1 * | 10/2018 | Mir Shafiei .......... G02B 6/2934 |
| 2019/0253775 A1 * | 8/2019 | Seok ..................... H04J 14/02 |

FOREIGN PATENT DOCUMENTS

| KR | 101710813 B1 | 2/2017 |
| KR | 101720434 B1 | 3/2017 |
| KR | 102272597 B1 | 7/2021 |

* cited by examiner

*Primary Examiner* — Chad H Smith
(74) *Attorney, Agent, or Firm* — Harness, Dickey & Pierce, P.L.C.

(57) ABSTRACT

Disclosed herein is a recirculating programmable photonic circuit including a programmable optical coupler including two first programmable waveguides and configured to adjust optical coupling efficiency of an optical signal based on a vertical movement of one of the two first programmable waveguides, a phase shifter including a second programmable waveguide and configured to change a phase of the optical signal based on a horizontal movement of the second programmable waveguide with respect to the first programmable waveguides, a plurality of core cells connected to each of the programmable optical coupler and the phase shifter to form a predetermined shape, the core cells being selectively driven by moving the optical signal from the predetermined shape according to the optical coupling efficiency and the phase, and an actuator electrically connected to one side of each of the plurality of core cells and configured to control the vertical movement and the horizontal movement.

16 Claims, 21 Drawing Sheets

410

420

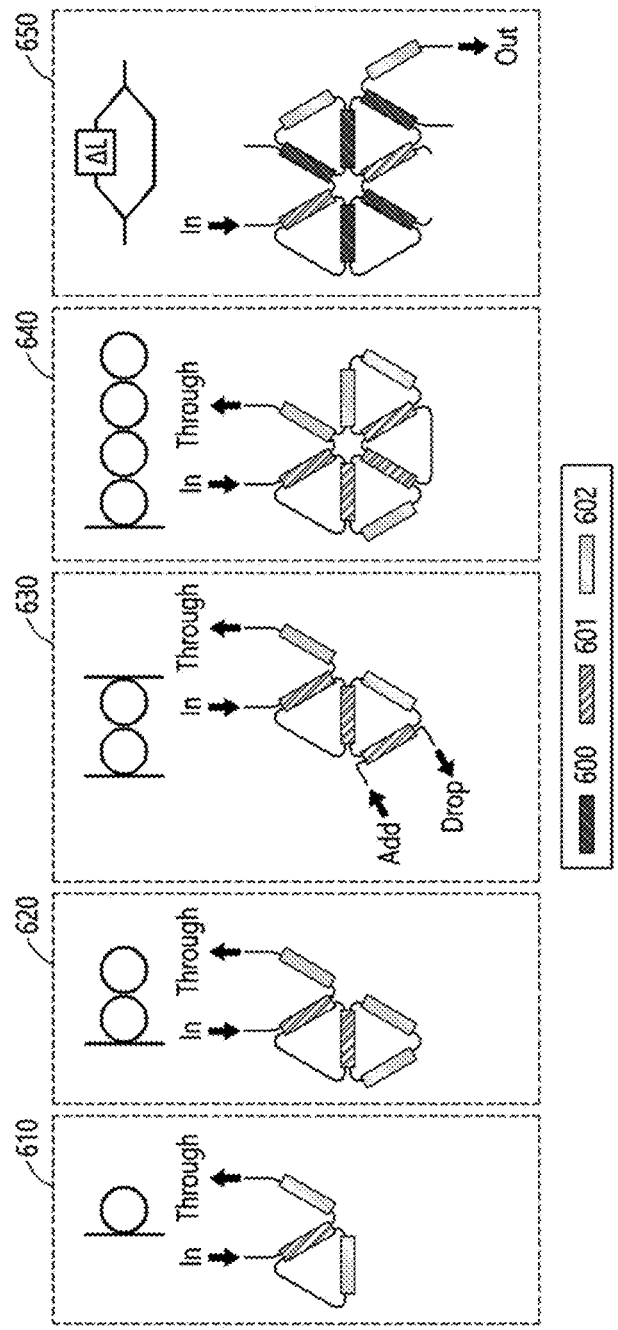

RECIRCULATING PROGRAMMABLE PHOTONIC CIRCUITS AND OPERATING METHOD THEREOF

CROSS-REFERENCES TO RELATED APPLICATION

This application claims the priority benefit of Korean Patent Application No. 10-2020-0181419, filed on Dec. 22, 2020, and Korean Patent Application No. 10-2021-0130530, filed on Oct. 1, 2021, in the Korean Intellectual Property Office, the disclosure of each of which is incorporated herein by reference.

BACKGROUND OF THE DISCLOSURE

Field of the Disclosure

The present disclosure relates to recirculating programmable photonic circuits and an operating method thereof, and more particularly, to a recirculating programmable photonic circuit capable of performing phase shift while adjusting the efficiency of optical coupling using a programmable waveguide in a core cell connecting a programmable optical coupler and a phase shifter, thereby enabling recirculation of the core cell and implementation of various applications.

Description of the Related Art

Photonic integrated circuits (PICs) have become a powerful platform for complex optical systems because of their ability to monolithically integrate high-density optical elements.

The PICs are expected to follow the scaling path of electronics by utilizing advanced manufacturing processes for general electronic integrated circuits.

However, since most PIC designs are dedicated to a single target application, it is difficult to efficiently reuse the PICs for other purposes.

The concept of a programmable photonic circuit (PPC), an optical counterpart to a field programmable gate array (FPGA) circuit, has attracted considerable attention in recent years.

PICs may greatly reduce prototyping time and cost and serve as general-purpose optical circuits, but the scale of the demonstration thereof is relatively small compared to FPGAs.

Moreover, the number of unit elements is still very small regarding recirculation of a PPC capable of performing general linear transformation as well as radio frequency (RF) signal processing. For example, the number of unit elements may be 10 or less per chip.

This partly results from the large footprint of the unit cell (less than or equal to 1 mm per edge) and high power consumption (less than or equal to 10 mW per cell).

Photonic circuits are optimized for specific targets (e.g., filters, switches, sensors, communication, etc.), and thus the design of the chip is not efficiently reused, and repeated design changes and experiments are required until mass production is reached.

Recently, the concept of a programmable photonic circuit corresponding to the concept of a field programmable gate array of an electronic circuit has emerged and draw much attention, but the degree of integration thereof is in its infancy.

The recirculating programmable photonic circuit (R-PPC), which is the most common type of programmable photonic circuit, has been spotlighted as a technology that will dramatically reduce design and manufacturing costs of optical circuits and enable small quantity batch production.

In addition, the R-PPC is applicable to a parallel operator, a high-speed optical signal processor, a quantum interferometer, and the like.

However, for the R-PPC according to the conventional technology, the number of cores is less than 8.

In addition, for the R-PPC according to the conventional technology, the core is configured with a thermo-optical 2×2 Mach-zehnder interferometer (MZI), and the thermo-optical MZI has low modulation efficiency. Accordingly, the R-PPC requires a long length of 1 mm or more and large power consumption of 10 mW or more For such reasons, the area of the R-PPC having merely 7 cores reaches 15 mm$^2$.

SUMMARY OF THE DISCLOSURE

Therefore, the present disclosure has been made in view of the above problems, and it is an object of the present disclosure to provide a recirculating programmable photonic circuit capable of performing phase shift while adjusting the efficiency of optical coupling between core cells using programmable waveguides, which are controlled by an actuator in a core cell configured by connecting a programmable optical coupler and a phase shifter, thereby enabling recirculation of the core cells and implementation of various applications.

It is another object of the present disclosure to increase the number of core cells by reducing the area and power consumption of a core cell using a programmable waveguide controlled by an actuator in the core cell configured by connecting a programmable optical coupler and a phase shifter.

It is another object of the present disclosure to dramatically enhance system complexity and increase the number of implementable applications by increasing the number of core cells as it is possible to perform phase shift while adjusting the efficiency of optical coupling using programmable waveguides, which are controlled by an actuator in a core cell configured by connecting a programmable optical coupler and a phase shifter.

It is another object of the present disclosure to provide various applications such as photodetectors, parallel matrix-vector multipliers, RF optical filters, and quantum optical interferometers using a recirculating programmable photonic circuit.

It is another object of the present disclosure to provide a recirculating programmable photonic circuit including core cells having various structures based on a structure in which a programmable optical coupler and a phase shifter are connected. In accordance with an aspect of the present invention, the above and other objects can be accomplished by the provision of a recirculating programmable photonic circuit, comprising: a programmable optical coupler including two first programmable waveguides and configured to adjust optical coupling efficiency of an optical signal based on a vertical movement of one of the two first programmable waveguides; a phase shifter including a second programmable waveguide and configured to change a phase of the optical signal based on a horizontal movement of the second programmable waveguide with respect to the first programmable waveguides; a plurality of core cells connected to each of the programmable optical coupler and the phase shifter to form a predetermined shape, the core cells being selectively driven by moving the optical signal from the predetermined shape according to the adjusted optical coupling efficiency and the changed phase; and an actuator electrically connected to one side of each of the plurality of core cells and configured to control the vertical movement of the one first programmable waveguide and the horizontal movement of the second programmable waveguide.

At least one core cell among the plurality of core cells may be selectively driven as a recirculating core cell according to the moved optical signal, at least one core cell among the plurality of core cells may be connected to an input terminal and may be driven as an input core cell to receive the optical signal input thereto, and at least one core cell among the plurality of core cells may be connected to an output terminal and may be driven as an output core cell to output data about the optical signal.

At least one core cell among the plurality of core cells may be selectively driven as a recirculating core cell according to the moved optical signal, and the at least one core cell may determine a path of the moved optical signal according to a size of an offset between the two first programmable waveguides of the programmable optical coupler.

At least one core cell among the plurality of core cells may determine that the path of the moved optical signal is in any one of a bar state, a partial coupling state, and a cross state according to the size of the offset.

The programmable optical coupler may include a first programmable waveguide at one side of one core cell among the plurality of core cells and a first programmable waveguide at one side of another core cell among the plurality of core cells with a horizontal gap of a predetermined size formed therebetween, a vertical offset between the two first programmable waveguides may be controlled based on a vertical movement of one of the two first programmable waveguides, and the optical coupling efficiency of the optical signal is controlled based on the controlled vertical offset.

The programmable optical coupler may adjust the optical coupling efficiency of the optical signal, such that: when a size of the controlled vertical offset is greater than a reference size, the optical signal at the one side of the one core cell is transferred to another side; and when the size of the controlled vertical offset is less than the reference size, the optical signal at the one side of the one core cell is transferred to the one side of the other core cell.

The size of the controlled vertical offset may be 0 nm to 500 nm, and the reference size may be 400 nm.

The phase shifter may include the second programmable waveguide positioned on a lateral side of the first programmable waveguide at one side of one core cell among the plurality of core cells and approaching the lateral side along a horizontal axis.

The phase shifter may change the phase of the optical signal by adjusting an effective refractive index of the optical signal according to a horizontal gap between the first programmable waveguide and the second programmable waveguide adjusted based on the horizontal movement of the second programmable waveguide.

The phase shifter may change the phase of the optical signal in inverse proportion to a size of the adjusted horizontal gap.

The plurality of core cells may have any one cell structure among a square cell structure, a hexagonal cell structure, and a triangular cell structure based on the predetermined shape.

When one core cell among the plurality of core cells has the triangular cell structure, the one core cell may include one side on which the first programmable waveguides are controlled by the actuator and two sides on which the first programmable waveguides are not controlled by the actuator.

The one side on which the first programmable waveguides are controlled and the two sides on which the first programmable waveguides are not controlled may be selectively determined as a movement path of the optical signal based on control of the actuator.

In accordance with another aspect of the present invention, there is provided a method of operating a recirculating programmable photonic circuit including a plurality of core cells each being connected to a programmable optical coupler including two first programmable waveguides and a phase shifter including a second programmable waveguide to form a predetermined shape, and an actuator electrically connected to one side of each of the plurality of core cells and configured to control a vertical movement of the first programmable waveguides and a horizontal movement of the second programmable waveguide, the method comprising: adjusting, by the programmable optical coupler, optical coupling efficiency of the optical signal based on the vertical movement of one of the two first programmable waveguides; changing, by the phase shifter, a phase of the optical signal based on the horizontal movement of the second programmable waveguide with respect to the first programmable waveguides; and selectively driving at least one core cell among the plurality of core cells by moving the optical signal from the predetermined shape according to the adjusted optical coupling efficiency and the changed phase in the plurality of core cells.

The selective driving of the at least one core cell among the plurality of core cells may include: selectively driving at least one core cell among the plurality of core cells as a recirculating core cell according to the moved optical signal; determining that a path of the moved optical signal is in any one state among a bar state, a partial coupling state, and a cross state according to a size of an offset between the two first programmable waveguides of the programmable optical coupler; and determining the path of the moved optical signal based on the determined state.

The adjusting of the optical coupling efficiency of the optical signal based on the vertical movement of the one of the two first programmable waveguides may include: controlling a vertical offset between a first programmable waveguide at one side of one core cell among the plurality of core cells and a first programmable waveguide at one side of another other core cell among the plurality of core cells, based on a vertical movement of one of the first programmable waveguides arranged with a horizontal gap of a predetermined size formed therebetween; and adjusting the optical coupling efficiency of the optical signal based on the controlled vertical offset.

BRIEF DESCRIPTION OF THE DRAWINGS

The above and other objects, features and other advantages of the present disclosure will be more clearly understood from the following detailed description taken in conjunction with the accompanying drawings, in which:

FIG. 6 is a view illustrating various configurations based on a recirculating programmable photonic circuit according to one embodiment of the present disclosure;

DETAILED DESCRIPTION OF THE INVENTION

Figure 1:
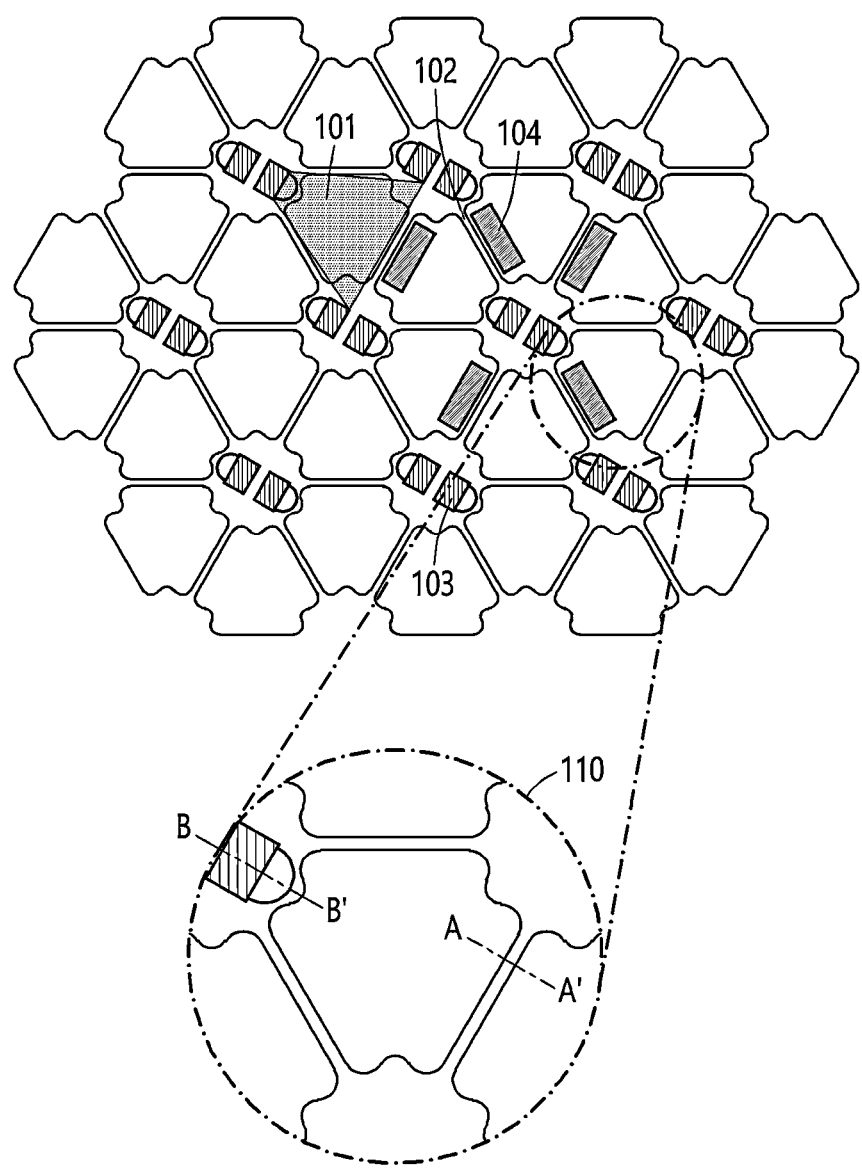
FIG. 1 is a diagram illustrating a recirculating programmable photonic circuit according to one embodiment of the present disclosure.

Specific structural and functional descriptions of embodiments according to the concept of the present disclosure disclosed herein are merely illustrative for the purpose of explaining the embodiments according to the concept of the present disclosure. Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings. However, it should be understood that the present disclosure is not limited to the embodiments according to the concept of the present disclosure, but includes changes, equivalents, or alternatives falling within the spirit and scope of the present disclosure.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the scope of rights according to the concept of the present invention.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" in the specification should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure will now be described more fully with reference to the accompanying drawings, in which exemplary embodiments of the invention are shown. This disclosure may, however, be embodied in many different forms and should not be construed as limited to the exemplary embodiments set forth herein. Like reference numerals in the drawings denote like elements.

FIG. 1 is a diagram illustrating a recirculating programmable photonic circuit according to one embodiment of the present disclosure.

FIG. 1 illustrates the components of a recirculating programmable photonic circuit according to one embodiment of the present disclosure.

Referring to FIG. 1, according to one embodiment of the present disclosure, a recirculating programmable photonic circuit 100 includes a core cell 101, a programmable optical coupler 102, a phase shifter 103, and an actuator 104.

For example, the recirculating programmable photon circuit 100 includes a plurality of core cells 101 each including the programmable optical coupler 102, the phase shifter 103, and the actuator 104.

According to one embodiment of the present disclosure, an additional description may be made of the core cell 101 of the recirculating programmable photonic circuit 100 with reference to an enlarged view 110, a first cross-sectional A-A' and a second cross-sectional B-B'.

Figure 2A:
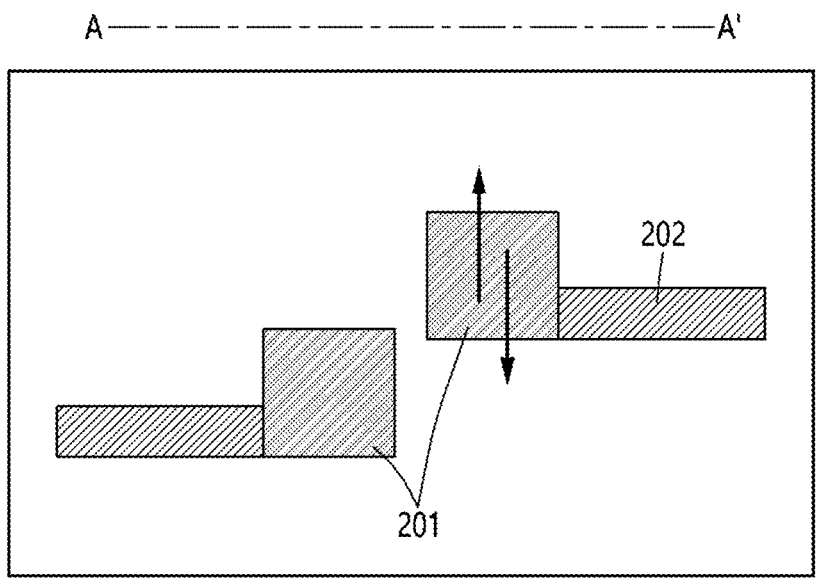
FIGS. 2A and 2B are views illustrating a cross-sectional change of a recirculating programmable photonic circuit based on driving of programmable waveguides according to one embodiment of the present disclosure.
Figure 2B:
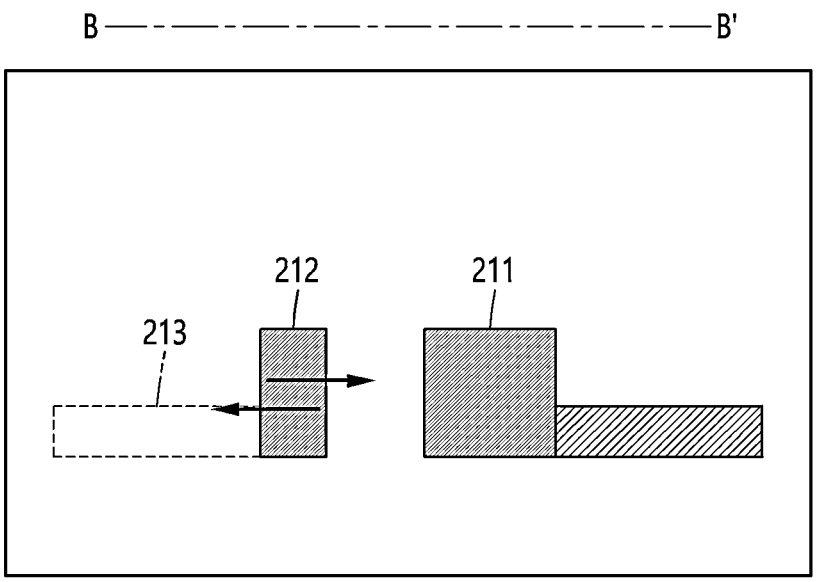

The description of the first cross-section A-A' will be supplemented using FIG. 2A, and the description of the second cross-section B-B' is supplemented using FIG. 2B.

According to one embodiment of the present disclosure, in the core cell 101, the programmable optical coupler 102 and the phase shifter 103 are connected to each other in a preset shape, and an optical signal according to optical coupling efficiency adjusted based on the programmable optical coupler 102 and the phase changed by the phase shifter 103 may be moved from a preset shape formed by the sides of the core cell 101 and the core cell may be selectively driven as a recirculating core cell.

For example, according to the optical signal moved based on the programmable optical coupler 102 and the phase shifter 103, the core cell 101 may be selectively driven as a recirculating core cell, or may be connected to an input or output terminal and be driven as an input core cell or an output core cell.

According to one embodiment of the present disclosure, the core cell 101 may be selectively driven as a recirculating core cell according to the optical signal moved based on the programmable optical coupler 102 and the phase shifter 103, and may determine the path of the moved optical signal according to the size of the vertical offset between two first programmable waveguides constituting the programmable optical coupler 102.

For example, the core cell 101 may determine the path of the moved optical signal according to the size of the offset as any one of a bar state, a partial coupling state, and a cross state to determine the movement path of the optical signal.

The bar state, partial coupling state, and cross state will be further described later with reference to FIGS. 6 and 8.

For example, when one core cell 101 among the plurality of core cells has a triangular cell structure, the core cell 101 may include one side on which the first programmable waveguide is controlled by the actuator 104, and two sides on which the first programmable waveguide is not controlled by the actuator 104.

For example, one side on which the first programmable waveguide is controlled and the two sides on which the first programmable waveguide is not controlled may be selectively determined as a path through which the optical signal moves based on the control of the actuator 104.

According to one embodiment of the present disclosure, the programmable optical coupler 102 may include two first programmable waveguides. The optical coupling efficiency of the optical signal may be adjusted based on the vertical movement of one first programmable waveguide between the two first programmable waveguides.

For example, the optical coupling efficiency of the optical signal may be related to light transmission and light transmittance.

For example, the programmable optical coupler 102 may include the first programmable waveguide at one side of any one of the plurality of core cells and the first programmable waveguide at one side of another one of the plurality of core cells at a predetermined horizontal gap.

In addition, the programmable optical coupler 102 may control a vertical offset between the two first programmable waveguides based on a vertical movement of one of the two first programmable waveguides, and adjust the optical coupling efficiency of the optical signal based on the controlled vertical offset.

According to one embodiment of the present disclosure, the phase shifter 103 may include a second programmable waveguide, and may change the phase of the optical signal based on a horizontal movement of the second programmable waveguide with respect to the first programmable waveguide.

For example, the phase shifter 103 may include a second programmable waveguide positioned on a lateral side of the first programmable waveguide at one side of any one of the plurality of core cells and approaching the lateral side along a horizontal axis.

According to one embodiment of the present disclosure, the phase shifter 103 may change the phase of the optical signal as the effective refractive index of the optical signal is adjusted by adjusting the horizontal gap between the first programmable waveguide and the second programmable waveguide based on the horizontal movement of the second programmable waveguide.

For example, the phase shifter 103 may change the phase of the signal in inverse proportion to the size of the horizontal gap adjusted by the actuator 104.

That is, when the size of the horizontal gap increases, the phase change of the optical signal is small. When the size of the horizontal gap decreases, the phase change of the optical signal may be large.

For example, when the length of the programmable optical coupler 102 is 50 μm and the length of the phase shifter 103 is 15 μm, one side of the core cell 101 may be implemented to be 100 μm or less, and the core cell 101 may be formed to have an area less than or equal to 0.1 mm$^2$ even when it is electrically connected to the actuator 104.

According to one embodiment of the present disclosure, the actuator 104 may be electrically connected to one side of each of the plurality of core cells, and may control the vertical movement of any one of the first programmable waveguides and the horizontal movement of the second programmable waveguide.

That is, the core cell 101 may include an actuator 104 electrically connected to one side thereof, and the actuator 104 may control the vertical movement of the first programmable waveguide at one side of the core cell 101 or control the left-right horizontal movement of the second programmable waveguide on a lateral side of the first programmable waveguide.

For example, the first programmable waveguide may correspond to a main waveguide, and the second programmable waveguide may correspond to an auxiliary waveguide.

For example, a programmable photonic circuit is a concept of an optical circuit corresponding to a field programmable gate array of an electronic circuit, and may refer to a system that is programmable by directly programming a function by a user in a lattice or mesh of core cells of the same unit subjected to programmable optical coupling therebetween.

According to one embodiment of the present disclosure, the recirculating programmable photonic circuit 100 may be operated by an operating method of the recirculating programmable photonic circuit, and the above-described operating characteristics of the recirculating programmable photonic circuit 100 may be implemented.

For example, a core cell is a basic unit element of the programmable photonic circuit, may correspond to a gate of a field programmable gate array, and may be configured by connecting a programmable optical coupler and a phase modulator in various forms.

Therefore, the present disclosure may provide a recirculating programmable photonic circuit capable of performing phase shift while adjusting the efficiency of optical coupling between core cells using programmable waveguides, which are controlled by an actuator in a core cell configured by connecting a programmable optical coupler and a phase shifter, thereby enabling recirculation of the core cells and implementation of various applications.

FIGS. 2A and 2B are views illustrating a cross-sectional change of a recirculating programmable photonic circuit based on driving of programmable waveguides according to one embodiment of the present disclosure.

FIG. 2A illustrates a cross-sectional change of a programmable optical coupler based on vertical driving of a programmable waveguides according to one embodiment of the present disclosure.

FIG. 2A exemplarily shows a first cross-section A-A' of the core cell illustrated in FIG. 1. The first cross-section A-A' corresponds to a cross-section 200 of the programmable optical coupler.

The cross-section 200 of the programmable optical coupler includes two first programmable waveguides 201. The size of the offset is controlled as any one of the two first programmable waveguides is moved up and down by the actuator 202.

According to one embodiment of the present disclosure, the programmable optical coupler includes two first programmable waveguides 201. The optical coupling efficiency of the optical signal may be adjusted as any one of the two first programmable waveguides is vertically moved based on the control of the actuator 202.

For example, the actuator 202 may control the size of the offset between the first programmable waveguides by moving the first programmable waveguides up and down according to a control method programmed in the computer.

FIG. 2B illustrates a cross-sectional change of a phase shifter based on horizontal driving of a programmable waveguide according to one embodiment of the present disclosure.

FIG. 2B exemplarily shows the second cross-section B-B' of the core cell illustrated in FIG. 1. The second cross-section B-B' corresponds to a cross-section 210 of the phase shifter.

In the cross-section 210 of the phase shifter, a second programmable waveguide 212 is positioned on a lateral side of a first programmable waveguide 211. As the second programmable waveguide 212 is horizontally moved by the actuator 213, the side of the gap between the waveguides is controlled.

According to one embodiment of the present disclosure, the phase shifter may change the phase of the optical signal based on the horizontal movement of the second programmable waveguide with respect to the first programmable waveguide 211.

That is, according to one embodiment of the present disclosure, the second programmable waveguide may be positioned on a lateral side of the phase shifter to correspond to one of the first programmable waveguides constituting the programmable optical coupler, and may change the phase of an optical signal moving to a side of the core cell related to the first programmable waveguide.

For example, the actuator 213 may control the gap between the first programmable waveguide and the second programmable waveguide by horizontally moving the second programmable waveguide left and right according to a control method programmed in the computer.

Figure 3A:
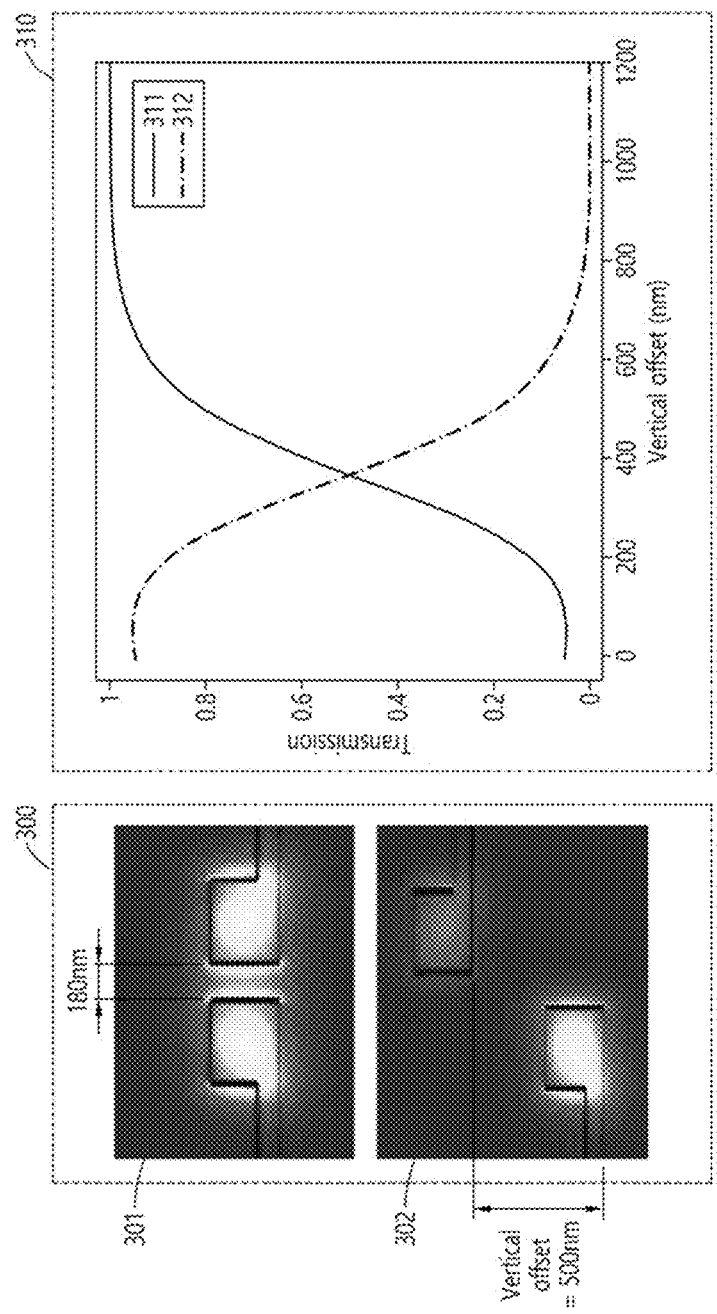
FIGS. 3A and 3B illustrate optical coupling efficiency and phase change of a recirculating programmable photonic circuit based on driving of a programmable waveguide according to one embodiment of the present disclosure.
Figure 3B:
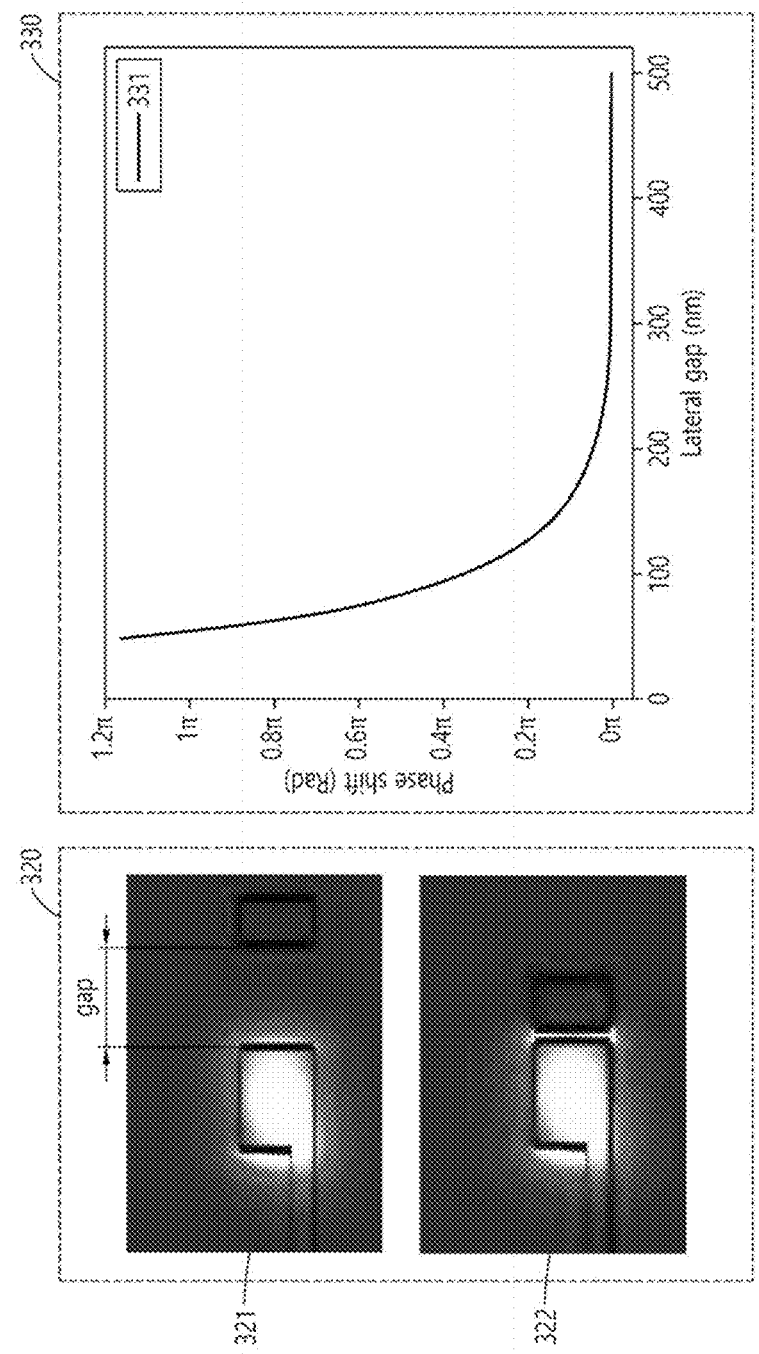

FIGS. 3A and 3B illustrate optical coupling efficiency and phase change of a recirculating programmable photonic circuit based on driving of a programmable waveguide according to one embodiment of the present disclosure.

FIG. 3A illustrates the optical coupling efficiency of the recirculating programmable photonic circuit based on vertical driving of a programmable waveguide according to one embodiment of the present disclosure.

FIG. 3A exemplarily shows an image 300, which includes an image 301 corresponding to a case where the vertical offset of the programmable optical coupler is 0 mm, and an image 302 corresponding to a case where the vertical offset is 500 mm.

Referring to the image 301, the programmable optical coupler is fabricated by separating the two first programmable waveguides constituting the programmable optical coupler by a gap of 180 nm.

Referring to the image 302, an offset between the two first programmable waveguides may be adjusted by attaching a MEMS actuator to any one waveguide of the two first programmable waveguides and vertically moving the same.

The graph 310 exemplarily depicts the optical coupling efficiency according to change in vertical offset using a graph line 311 and the graph line 312.

The graph line 311 indicates trough, and graph line 312 indicates drop.

The graph line 311 shows that the transmission related to the optical coupling efficiency tends to increase as the vertical offset increases, and the graph line 312 shows that the transmission related to the optical coupling efficiency tends to increase as the vertical offset decreases.

The graph 310 is a result of calculating the optical coupling efficiency for the position of the moving programmable waveguide by computational simulation. The optical coupling efficiency may be adjusted in the range of 0% to 100% with a length of only 50 μm.

In addition, the coupling efficiency is effectively controlled with a low power, thereby exhibiting low power consumption.

FIG. 3B illustrates a phase change of the recirculating programmable photon circuit based on horizontal driving of a programmable waveguide according to one embodiment of the present disclosure.

FIG. 3B exemplarily shows an image 320, which includes an image 321 corresponding to a case where a horizontal gap is formed between the first programmable waveguide and the second programmable waveguide by the phase shifter and an image 322 corresponding to a case where the horizontal gap is not present.

Referring to the images 321 and 322, when the phase shifter causes the second programmable waveguide corresponding to a waveguide having a smaller effective refractive index than the first programmable waveguide to approach a side of the first programmable waveguide, the effective refractive index of the first programmable waveguide is increased without loss of optical mode.

In the image 321, the gap between the first programmable waveguide and the second programmable waveguide may be 400 nm. In the image 322, the gap between the first programmable waveguide and the second programmable waveguide may be 50 nm.

Referring to the image 322, the gap between the first programmable waveguide and the second programmable waveguide may be adjusted by horizontally moving the second programmable waveguide left and right using a MEMS actuator.

That is, the phase change may be made by adjusting the effective refractive index by adjusting the gap between the first programmable waveguide and the second programmable waveguide by applying a voltage therebetween.

The graph 330 illustrates a phase change according to a change in a lateral gap between the first programmable waveguide and the second programmable waveguide, using a graph line 331.

The graph 330 is a result of calculating a phase change according to the change in distance between the second programmable waveguide and the first programmable waveguide having a length of 15 μm by computational simulation.

The graph line 331 depicts that the gap between the first programmable waveguide and the second programmable waveguide is 50 nm to 500 nm when the size of the phase change can be changed from $0\pi$ to $1.2\pi$.

Also, the graph line 331 depicts that the size of the phase change decreases as the gap between the first programmable waveguide and the second programmable waveguide increases.

In other words, the graph line depicts that the size of the phase change increases as the gap between the first programmable waveguide and the second programmable waveguide decreases.

For example, the programmable waveguide may be referred to as a micro-electro mechanical system (MEMS)-programmable waveguide.

Figure 4A:
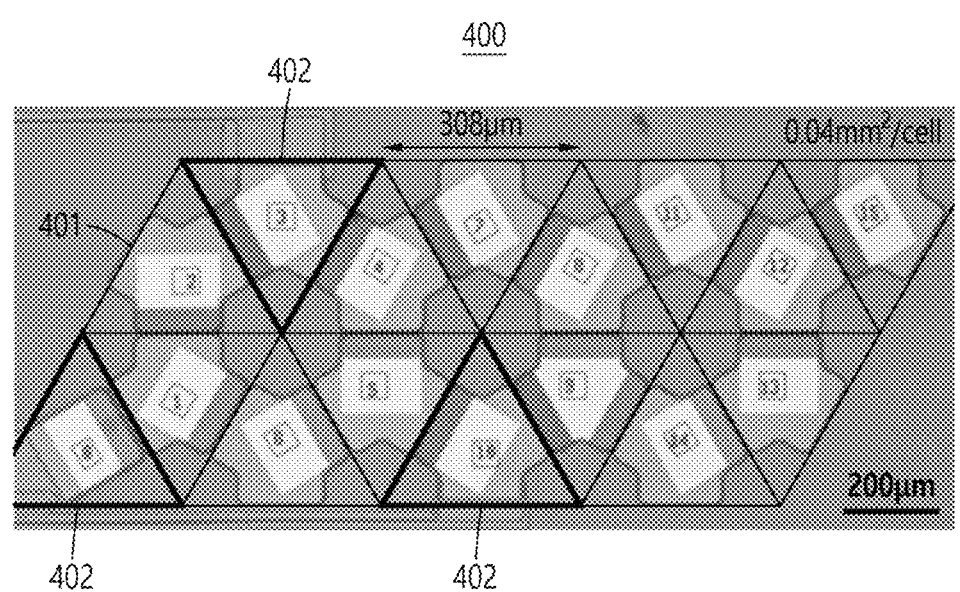
FIGS. 4A to 4C show scanning electron microscope images of a recirculating programmable photonic circuit according to one embodiment of the present disclosure.
Figure 4B:
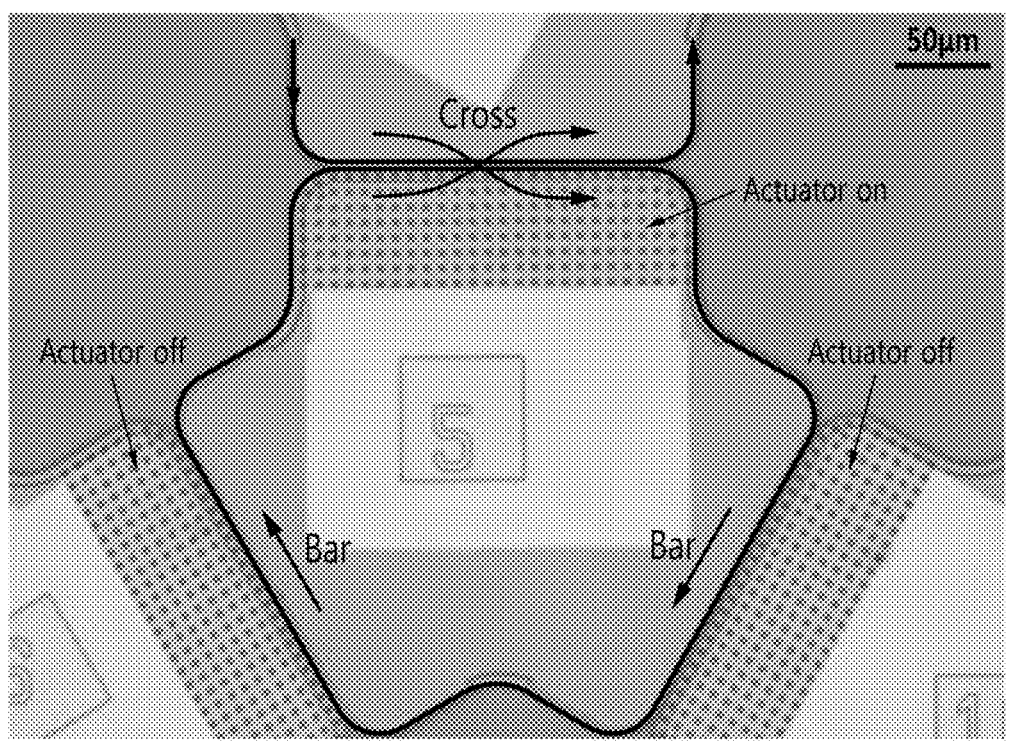
Figure 4C:
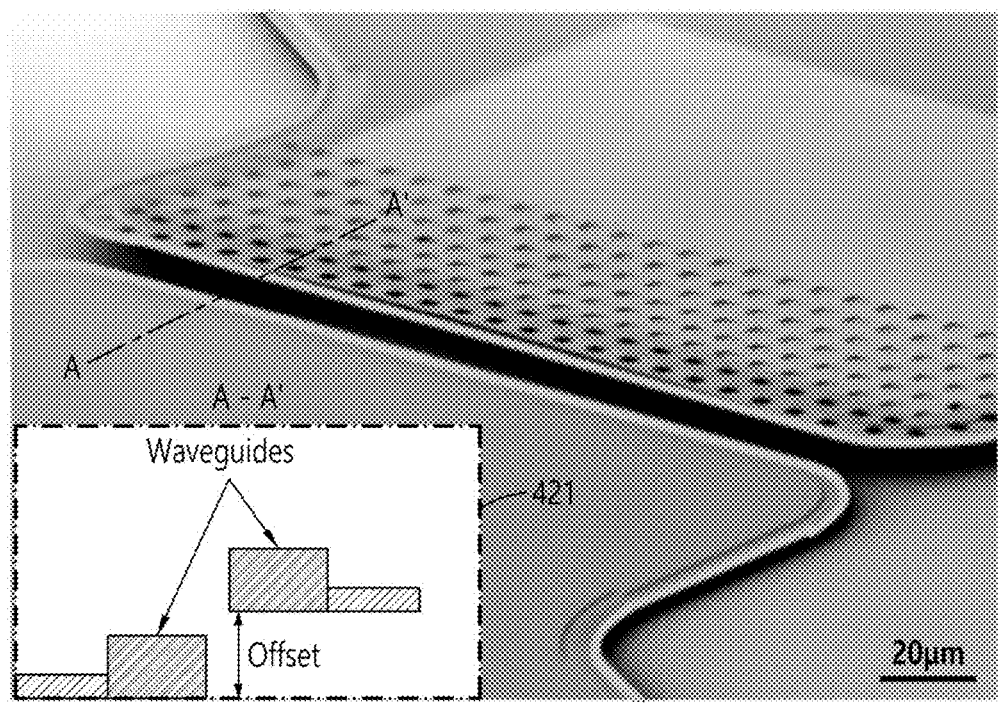

FIGS. 4A to 4C show scanning electron microscope images of a recirculating programmable photonic circuit according to one embodiment of the present disclosure.

FIG. 4A exemplarily shows a recirculating programmable photonic circuit according to one embodiment of the present disclosure.

Referring to FIG. 4A, a recirculating programmable photonic circuit 400 according to the embodiment of the present disclosure includes 16 triangular core cells, and the area of each cell is 0.04 mm².

A plurality of core cells may be divided into input/output core cells 402 and recirculating core cells 401.

Among the plurality of core cells, all remaining core cells except for three input/output core cells 402 may be recirculating core cells.

For example, the input/output core cells 402 refer to core cells to which an input terminal and an output terminal are connected.

Accordingly, the plurality of core cells may be selectively driven as a recirculating core cell according to an optical signal or may be connected to an input terminal or an output terminal to be driven as an input core cell or an output core cell.

According to one embodiment of the present disclosure, the recirculating programmable photon circuit 400 is fabricated on an 8-inch silicon insulator wafer with a thickness of 220 nm, and a triangular loop unit cell topology is utilized for a scalable mesh network topology.

FIG. 4B exemplarily show a scanning electron microscope image of a specific core cell in a recirculating programmable photonic circuit according to one embodiment of the present disclosure.

Referring to FIG. 4B, one core cell 410 among the recirculating core cells 401 of the recirculating programmable photonic circuit 400 illustrated in FIG. 4A has three sides. An actuator is positioned on one of the sides. The actuator is not positioned on the other sides.

However, the other sides where the actuator is not positioned are adjacent to the side where the actuator is positioned, and thus may be affected by the control operation of the actuators of other core cells.

The core cell 410 is connected in a cross state as the actuator is driven up and down on the side where the actuator is positioned to reduce the size of the vertical offset. On the other sides, the core cell is adjacent in bar state to adjacent core cells as the actuators of the adjacent core cells do not perform a control operation.

FIG. 4C illustrates the operation of the programmable optical coupler based on the operation by the actuator of the core cell illustrated in FIG. 4B.

Referring to FIG. 4C, the programmable optical coupler 420 corresponds to the first cross-section A-A' of the core cell. Referring to the cross-sectional view 421, the first programmable waveguide may be positioned on each of the core cells, and the vertical offset of the programmable optical coupler 420 may be controlled as any one of the first programmable waveguides is controlled by the actuator.

Accordingly, according to the present disclosure, the number of core cells may be increased by reducing the area and power consumption of the core cells using the programmable waveguides controlled by the actuators of the core cell configured by connecting the programmable optical coupler and the phase shifter.

In addition, the present disclosure may increase the number of core cells as phase shift can be performed while adjusting optical coupling efficiency between core cells using the programmable waveguide controlled by the actuator in the core cell configured by connecting the programmable optical coupler and the phase shifter. Accordingly, the number of implementable applications may be increased while dramatically enhancing the complexity of the system.

Figure 5:
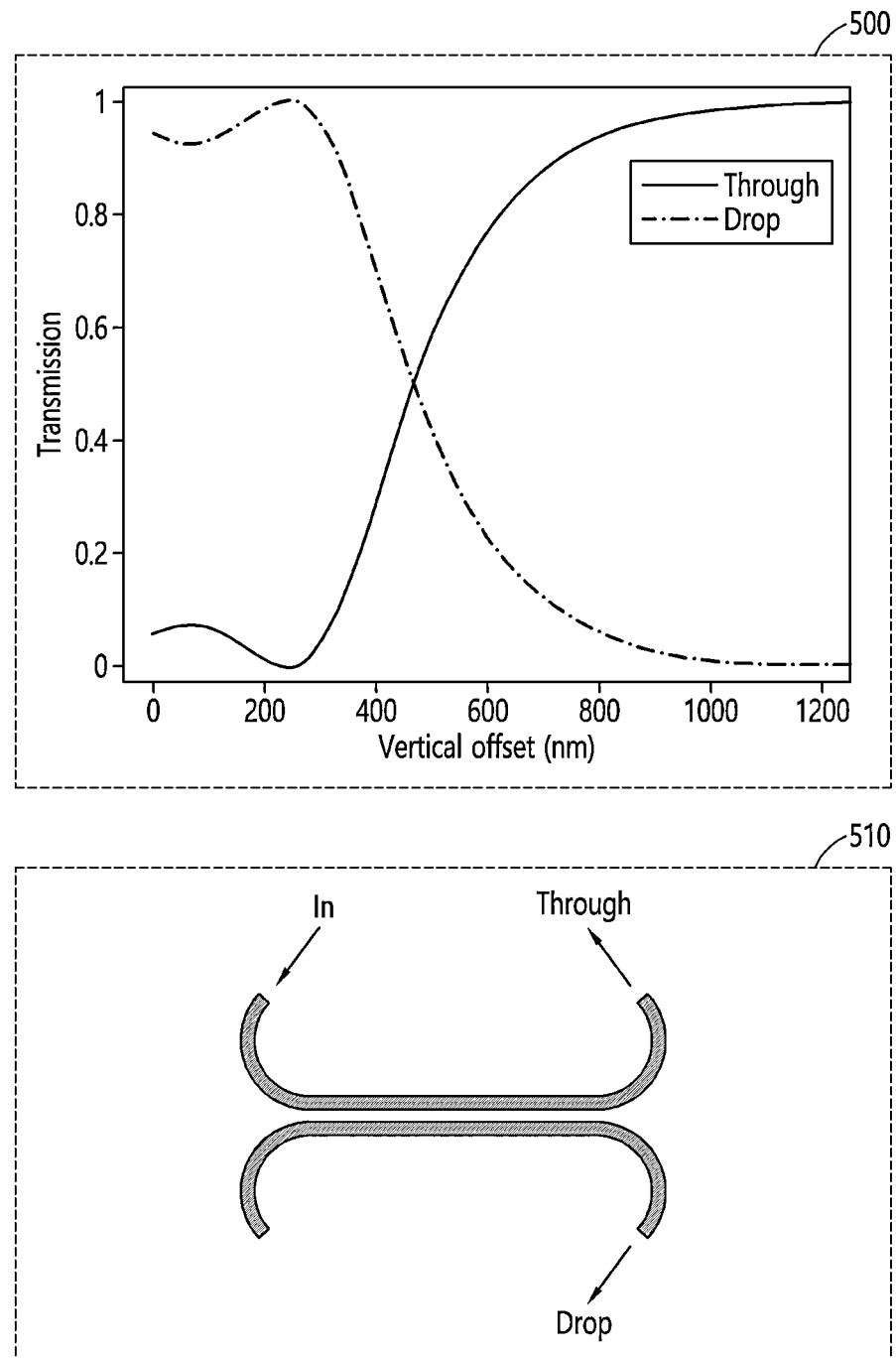
FIG. 5 depicts the flow of an optical signal corresponding to the optical coupling efficiency according to a change in vertical offset of the programmable optical coupler in a recirculating programmable photonic circuit according to one embodiment of the present disclosure.

FIG. 5 depicts the flow of an optical signal corresponding to the optical coupling efficiency according to a change in vertical offset of the programmable optical coupler in a recirculating programmable photonic circuit according to one embodiment of the present disclosure.

FIG. 5 exemplarily shows an optical signal flow in which an optical signal moves between sides of two cores constituting a programmable optical coupler according to a change in vertical offset according to one embodiment of the present disclosure.

Referring to FIG. 5, a graph 500 shows a change in transmission according to a change in vertical offset as "Through" and "Drop."

Referring to the signal flow diagram 510, when the vertical offset is large, the input In of the optical signal is passed through another other side in the same core cell.

When the vertical offset is small, the input of the optical signal is dropped and moved to one side in another core cell.

That is, in the programmable optical coupler, when the controlled vertical offset is larger than a reference size, the optical signal is transferred from one side of any one core cell to another side. When the controlled vertical offset is smaller than the reference size, the optical signal may be transferred from one side of one core cell to one side of another core cell. In this way, the optical coupling efficiency of the optical signal may be adjusted.

That is, when first programmable waveguides are adjacent to each other, the optical signal moves between the core cells constituting the programmable optical coupler. When the first programmable waveguides are vertically moved away from each other, the optical signal may not move between the core cells constituting the programmable optical coupler.

FIG. 6 is a view illustrating various configurations based on a recirculating programmable photonic circuit according to one embodiment of the present disclosure.

FIG. 6 shows exemplary configuration diagrams illustrating that a movement path of an optical signal is controlled by controlling a vertical movement of a first programmable waveguide of a programmable optical coupling unit in a recirculating programmable photonic circuit according to an embodiment of the present disclosure, and thus various corresponding configurations can be implemented.

Referring to FIG. 6, a configuration diagram 610 illustrates that in and through operations occur in one core cell to form a single ring structure.

A configuration diagram 620 illustrates that a through operation occurs according to the in operation in two core cells to form a dual ring structure.

Here, the dual ring structure may correspond to a coupled-resonator optical waveguide (CROW).

A configuration diagram 630 illustrates a case where an add-drop filter is configured together with the dual ring structure.

A configuration diagram 640 illustrates that a double CROW is formed in a four-ring structure.

A configuration diagram 650 illustrates implementation of a programmable mach-zehnder interferometer (MZI).

In each configuration diagram, a state 600 may represent a cross state, a state 601 may represent a bar state, and a state 602 may represent a partial coupling state.

Referring to the configuration diagrams 610 to 650, a system may be implemented by simplifying the basic unit of the core cell to minimize the number of programmable optical couplers by configuring the core as a triangle, which has the smallest number of sides.

FIGS. 7A to 7D depict spectral responses for various configurations based on a recirculating programmable photonic circuit according to one embodiment of the present disclosure.

Figure 7A:
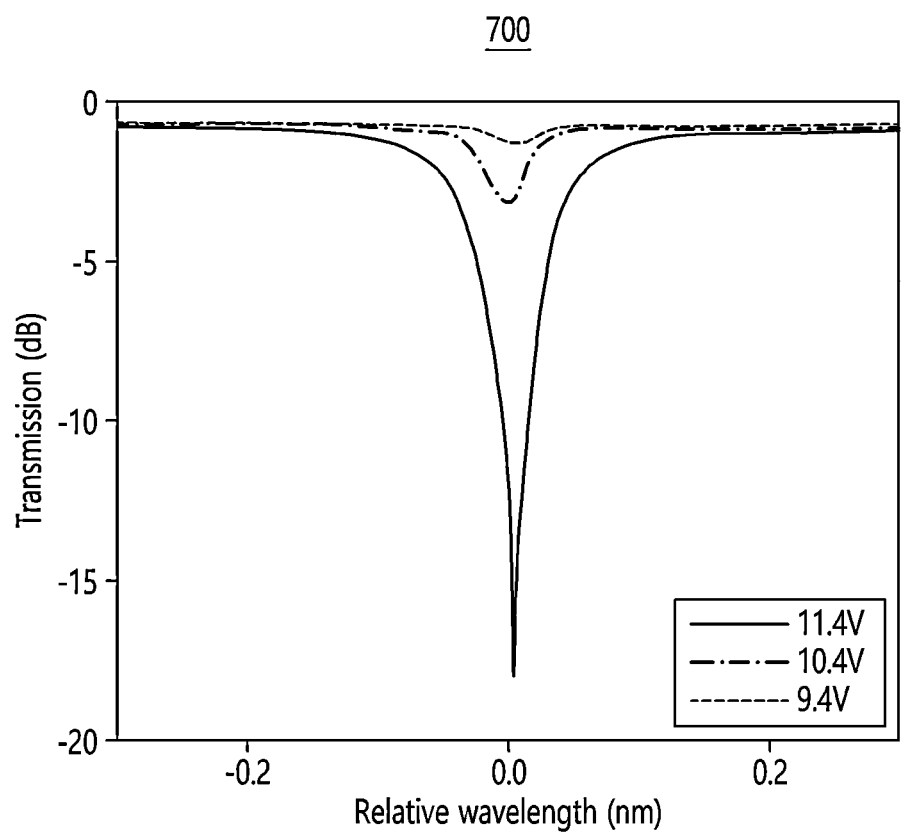
FIGS. 7A to 7D depict spectral responses for various configurations based on a recirculating programmable photonic circuit according to one embodiment of the present disclosure.

The graph 700 of FIG. 7A represents a single ring resonator of the configuration diagram 610 illustrated in FIG. 6 and shows that the coupling ratio may be adjusted by a voltage applied to the actuator.

The graph 700 depicts a change in transmission corresponding to an optical coupling ratio according to a voltage size at a relative wavelength.

Figure 7B:
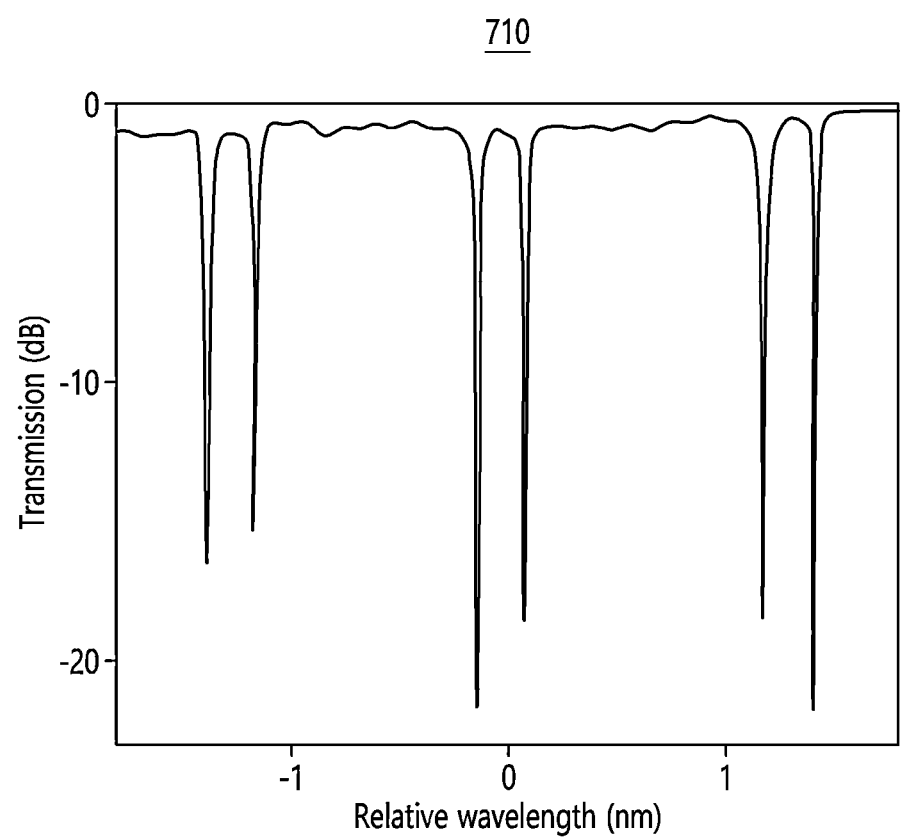

The graph 710 of FIG. 7B depicts the spectral response of the doubling-coupled resonator optical waveguide of the configuration diagram 630 illustrated in FIG. 6.

Figure 7C:
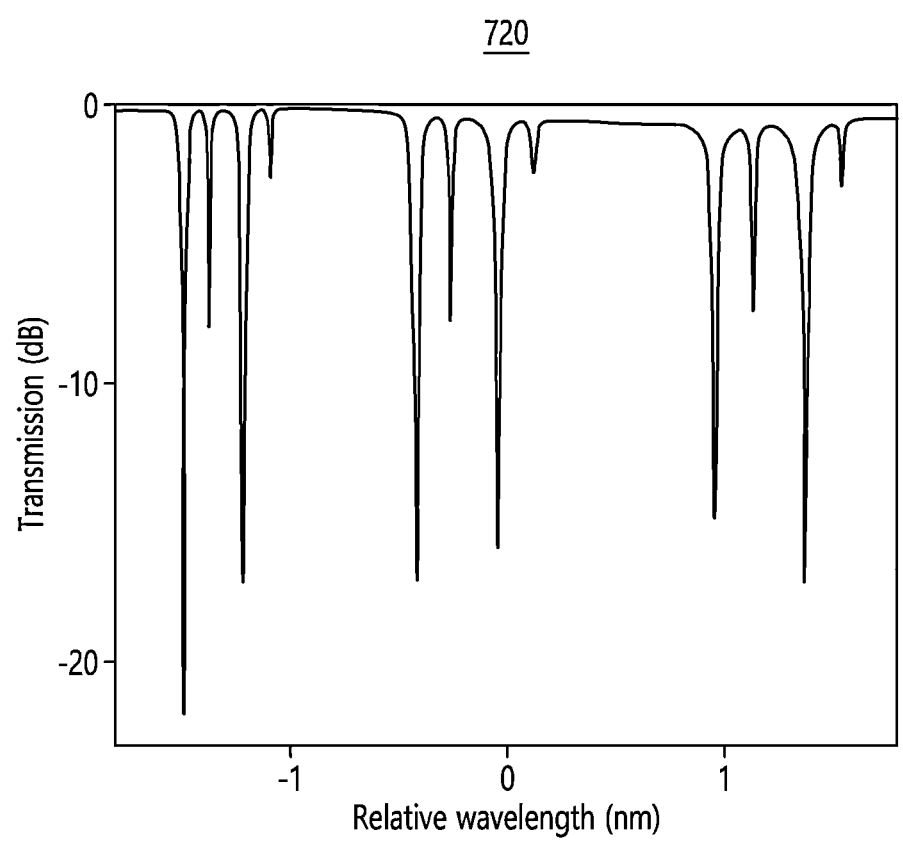

The graph 720 of FIG. 7C depicts the spectral response of the poring-coupled resonator optical waveguide of the configuration diagram 640 illustrated in FIG. 6.

The graph 710 and the graph 720 depict a change in transmission corresponding to an optical coupling ratio at a relative wavelength.

Figure 7D:
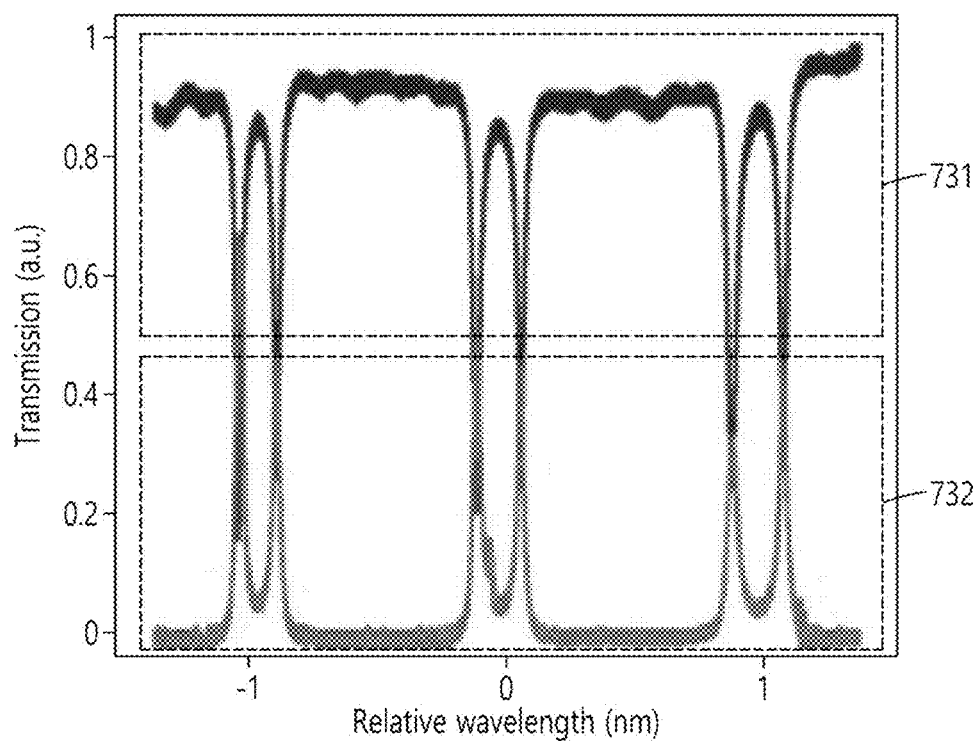

The graph 730 of FIG. 7D shows the spectral response of the add-drop filter with two rings of the configuration diagram 620 illustrated in FIG. 6.

In the graph 730, the region 731 may indicate Through and the region 732 may indicate a drop.

The spectral response may be measured using a combination of an external cavity laser adjustable near the 1550 nm wavelength and a photodetector.

A single mode fiber ribbon related to the single ring resonator of the configuration diagram 610 may be used to couple light through grating couplers connected to waveguides of input and output cells.

That is, the graphs 700 to 730 show that the number of core cells constituting the recirculating programmable photonic circuit can be increased and the core cells can be flexibly driven as recirculating core cells.

Figure 8:
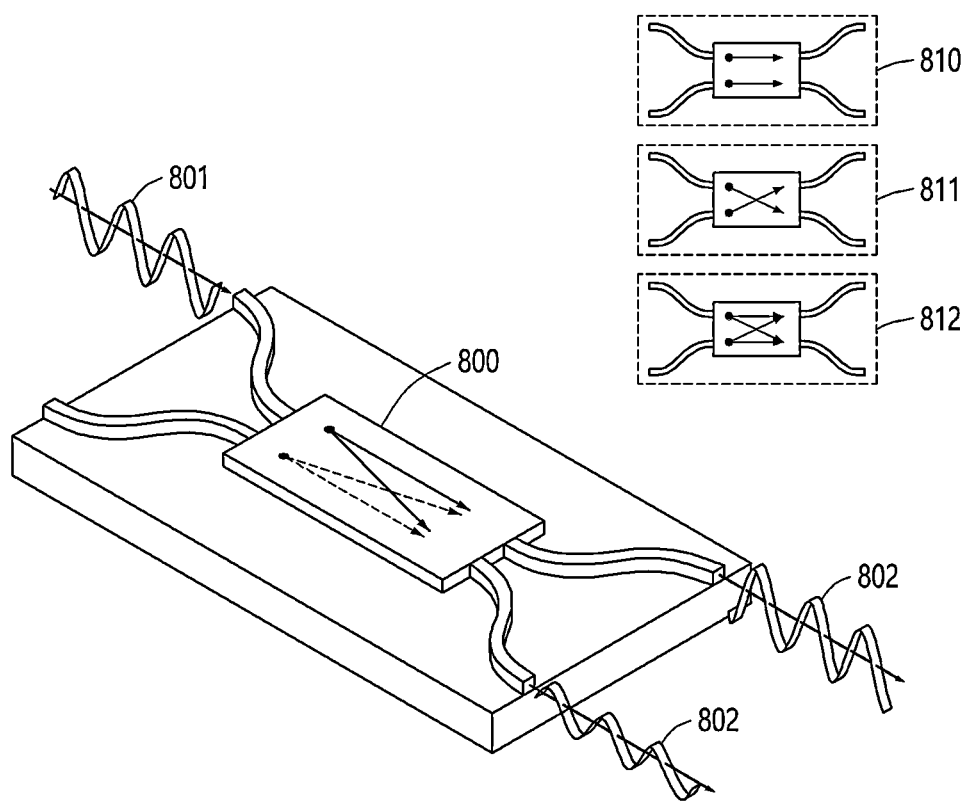
FIG. 8 is a view illustrating the flow of an optical signal according to a connection change of a programmable waveguide in a recirculating programmable photonic circuit according to one embodiment of the present disclosure.

FIG. 8 is a view illustrating the flow of an optical signal according to a connection change of a programmable waveguide in a recirculating programmable photonic circuit according to one embodiment of the present disclosure.

FIG. 8 further illustrates the flow of an optical signal in the programmable waveguide in the recirculating programmable photonic circuit according to one embodiment of the present disclosure.

A state of transference of an optical signal on the input waveguide and the output waveguide connected to a 2×2 optical gate 800 will be described with reference to FIG. 8.

For example, an input 801 may be applied to the 2×2 optical gate 800, and an output 802 may vary according to a bar state 810, a cross state 811, and a partial coupling state 812.

That is, the path of the optical signal flowing through the waveguides connected to the 2×2 optical gate 800 may be changed according to the state of the 2×2 optical gate 800.

For example, in the bar state 810, there is no coupling between waveguides for transferring the signal, and accordingly the optical signal is not transferred or is transferred only through an existing path.

In the cross state 811, the coupling between the waveguides for transferring the signal reaches 100%, and thus the optical signal is transferred through the cross path.

In the partial coupling state 812, paths through which the optical signal is transferred may overlap due to partial coupling between waveguides for transferring the signal.

Figure 9:
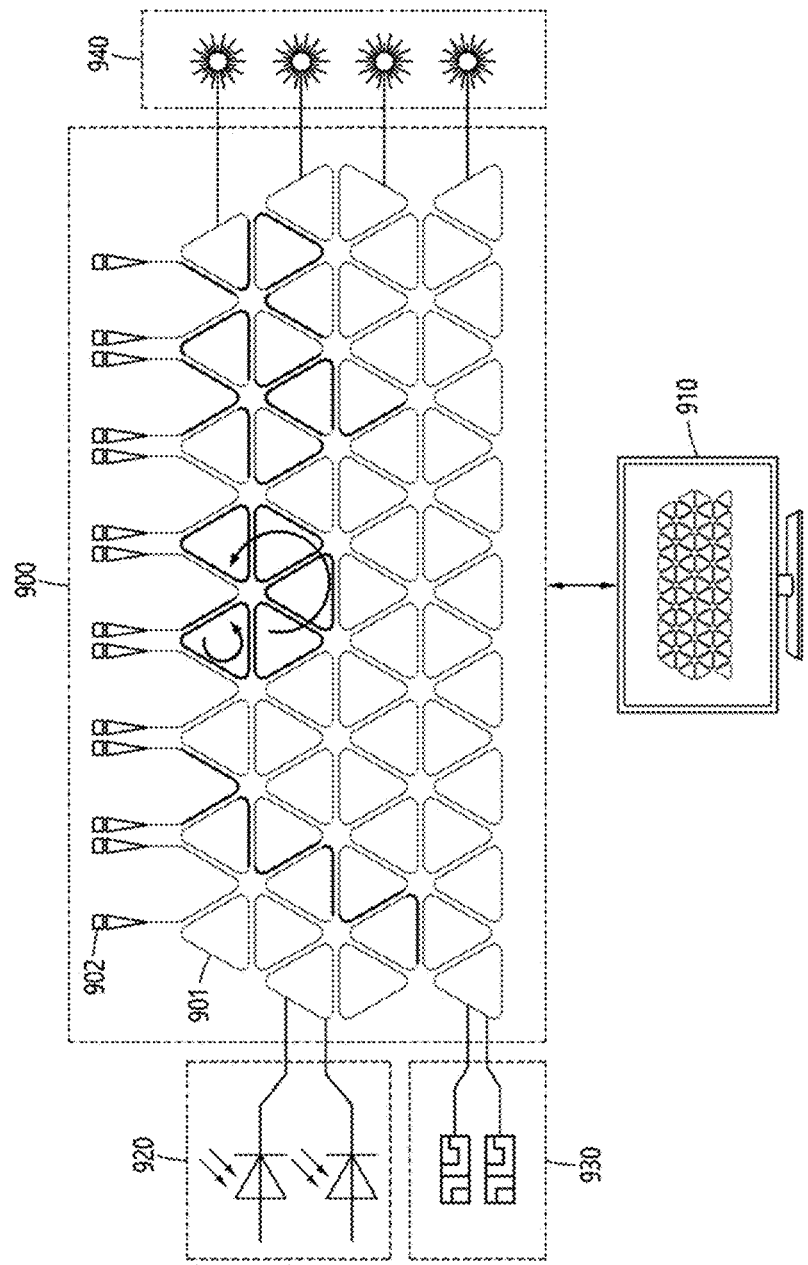
FIG. 9 is a diagram illustrating an application system using a recirculating programmable photonic circuit according to one embodiment of the present disclosure.

FIG. 9 is a diagram illustrating an application system using a recirculating programmable photonic circuit according to one embodiment of the present disclosure.

Referring to FIG. 9, a recirculating programmable photonic circuit 900 according to the embodiment of the present disclosure includes a plurality of core cells 901. An input/output cable 902 is connected to the core cell 901 via a grating coupler to apply an optical signal, and the core cell 901 is connected to a computer 910 to control the first programmable waveguide and the second programmable waveguide of the phase shifter and the programmable optical coupler of the core cell 901 based on the control of the computer 910. Thereby, the recirculating programmable photonic circuit 900 is driven to be programmable.

For example, the recirculating programmable photonic circuit 900, which is connected to a photodetector 920, receives an optical signal input from the photodetector 920 and selectively drives the recirculating core cells, such that the photodetector 920 processes data.

According to one embodiment of the present disclosure, the recirculating programmable photonic circuit 900 may be connected to an RF modulator 930 to operate as an RF optical filter by controlling an input signal input from the RF modulator 930 with an optical switch.

According to one embodiment of the present disclosure, the recirculating programmable photonic circuit 900 may be combined with an external cavity laser 940 and may be applied as an optical parallel matrix-vector multiplier, a system capable of performing matrix operations in parallel by applying the concept of wavelength division multiplexing of optical communication as the optical interferometric effect is multiplication of the electric field.

For example, the number of core cells in the recirculating programmable photonic circuit 900 may be increased up to 1024. When the number of core cells is 1024, the total area may be 100 $mm^2$ or less, the area per core cell may be 0.1 $mm^2$. Also, the total power may be 10 mW, and the power per core may be 0.01 mW or less.

Accordingly, the present disclosure may provide various applications such as a photodetector, a parallel matrix-vector multiplier, an RF optical filter, and a quantum optical interferometer, using the recirculating programmable photonic circuit.

Figure 10:
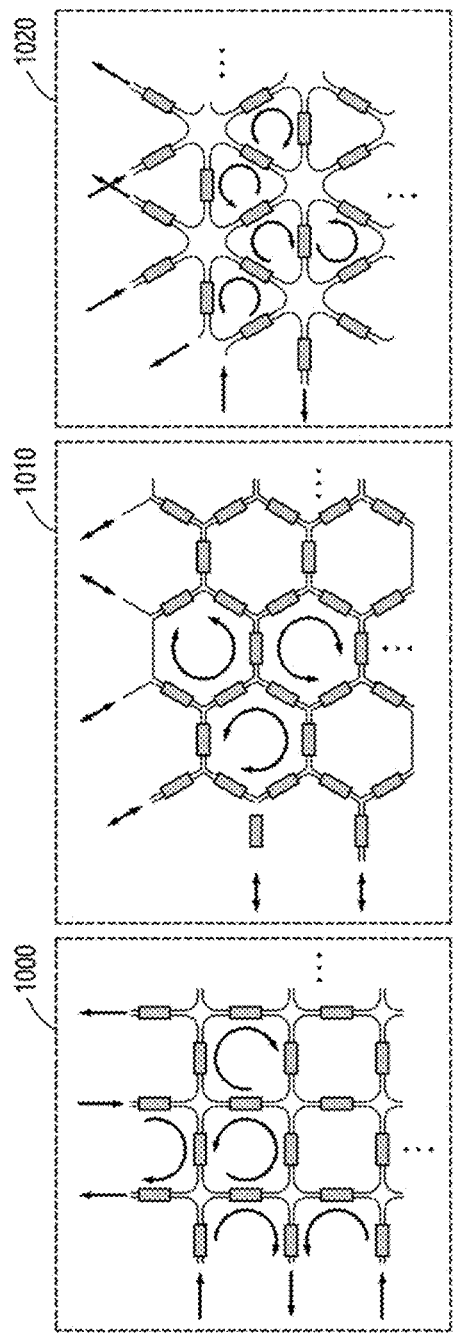
FIG. 10 illustrates core cells of various structures in a recirculating programmable photonic circuit according to one embodiment of the present disclosure.

FIG. 10 illustrates core cells of various structures in a recirculating programmable photonic circuit according to one embodiment of the present disclosure.

FIG. 10 illustrates that a plurality of core cells has a cell structure among a square cell structure, a hexagonal cell structure, and a triangular cell structure based on the form of connection between a programmable optical coupler and a phase shifter in a recirculating programmable photonic circuit according to one embodiment of the present disclosure.

Referring to FIG. 10, according to an embodiment of the present disclosure, a plurality of core cells in a recirculating programmable photonic circuit 1000 may have the square cell structure based on the form of connection between the programmable optical coupler and the phase shifter.

As an example, in a recirculating programmable photonic circuit 1010, a plurality of core cells may have the hexagonal cell structure based on the form of connection between the programmable optical coupler and the phase shifter.

According to an embodiment of the present disclosure, a plurality of core cells in the recirculating programmable photonic circuit 1010 may have the triangular cell structure based on the form of connection between the programmable optical coupler and the phase shifter.

Accordingly, the present disclosure may provide a recirculating programmable photonic circuit including core cells having various structures based on a structure in which a programmable optical coupler and a phase shifter are connected.

FIGS. 11A to 11D illustrates a method of manufacturing a recirculating programmable photonic circuit according to one embodiment of the present disclosure.

FIGS. 11A to 11D sequentially show a process of manufacturing a recirculating programmable photonic circuit according to one embodiment of the present disclosure.

Figure 11A:
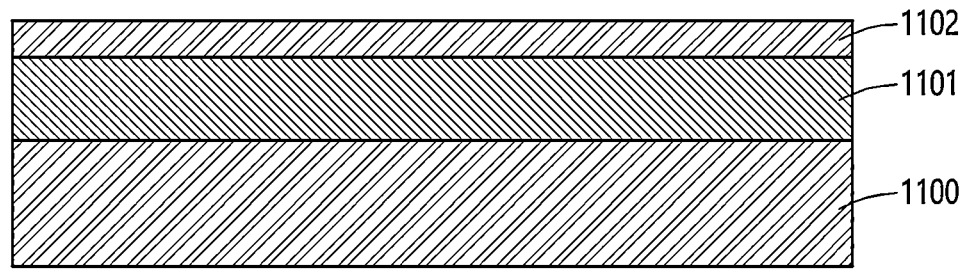
FIGS. 11A to 11D illustrates a method of manufacturing a recirculating programmable photonic circuit according to one embodiment of the present disclosure.

Referring to FIG. 11A, in the method of manufacturing a recirculating programmable photonic circuit according to the embodiment of the present disclosure, an 8-inch Silicon On Insulator (SOI) wafer process is performed in the process, a silicon oxide layer 1101 is formed on a silicon substrate 1100 to have a thickness of 2 μm, and a silicon layer 1102 of crystalline silicon is formed to have a thickness of 220 nm.

Figure 11B:
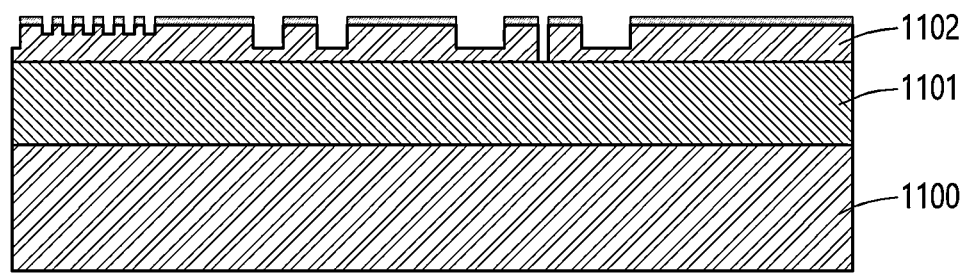

Referring to FIG. 11B, in the method of manufacturing a recirculating programmable photonic circuit according to the embodiment of the present disclosure, the silicon layer 1102 is etched to a depth of 70 nm and 80 nm, respectively, using the silicon oxide film as an etch mask, and is then etched again to a depth of 70 nm using a photoresist as an etch mask to deform the silicon layer 1102.

Figure 11C:
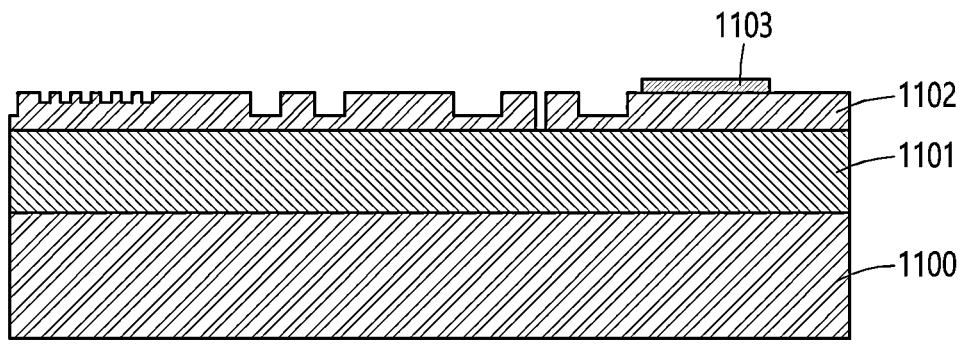

Referring to FIG. 11C, in the method of manufacturing a recirculating programmable photonic circuit according to the embodiment of the present disclosure, a metal layer 1103 for electrical connection is deposited on the etched silicon layer 1102.

Figure 11D:
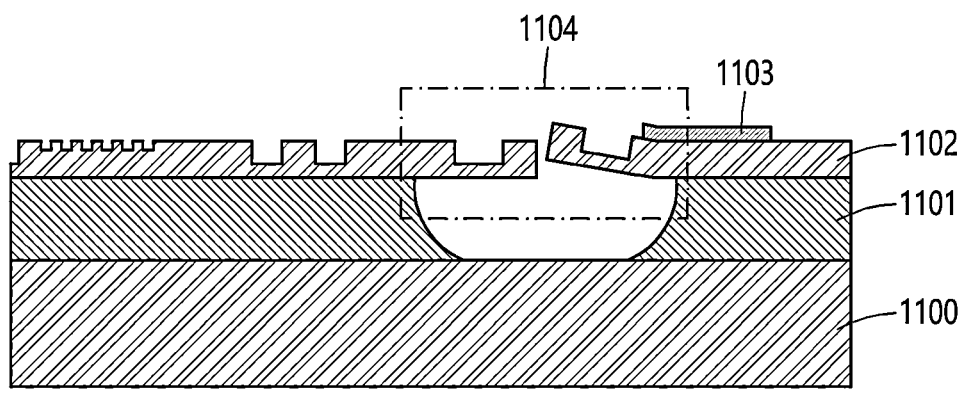

Referring to FIG. 11D, in the method of manufacturing a recirculating programmable photon circuit according to the embodiment of the present disclosure, a portion of the silicon oxide layer 1101 is removed by vapor etching to allow a programmable waveguide 1104 to move in a vertical direction.

The vertical offset between the programmable waveguides 1104 may be controlled by moving the programmable waveguides 1104 up and down by an actuator connected to the metal layer 1103.

The present disclosure may provide a recirculating programmable photonic circuit capable of performing phase shift while adjusting the efficiency of optical coupling between core cells using programmable waveguides, which are controlled by an actuator in a core cell configured by connecting a programmable optical coupler and a phase shifter, thereby enabling recirculation of the core cells and implementation of various applications.

According to the present disclosure, the number of core cells may be increased by reducing the area and power consumption of a core cell using a programmable waveguide controlled by an actuator in the core cell configured by connecting a programmable optical coupler and a phase shifter.

According to the present disclosure, phase shift may be performed while adjusting the efficiency of optical coupling using programmable waveguides, which are controlled by an actuator in a core cell configured by connecting a programmable optical coupler and a phase shifter. Accordingly, system complexity may be dramatically enhanced and the number of implementable applications may be increased by increasing the number of core cells.

The present disclosure may provide various applications such as photodetectors, parallel matrix-vector multipliers, RF optical filters, and quantum optical interferometers using a recirculating programmable photonic circuit.

The present disclosure may provide a recirculating programmable photonic circuit including core cells having various structures based on a structure in which a programmable optical coupler and a phase shifter are connected.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system.

In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

What is claimed is:

1. A recirculating programmable photonic circuit, comprising:
   a programmable optical coupler including two first programmable waveguides and configured to adjust optical coupling efficiency of an optical signal based on a vertical movement of one of the two first programmable waveguides;
   a phase shifter including a second programmable waveguide and configured to change a phase of the optical signal based on a horizontal movement of the second programmable waveguide with respect to the first programmable waveguides;
   a plurality of core cells connected to each of the programmable optical coupler and the phase shifter to form a predetermined shape, the core cells being selectively driven by moving the optical signal from the predetermined shape according to the adjusted optical coupling efficiency and the changed phase; and
   an actuator electrically connected to one side of each of the plurality of core cells and configured to control the vertical movement of the one first programmable waveguide and the horizontal movement of the second programmable waveguide.

2. The recirculating programmable photonic circuit of claim 1, wherein at least one core cell among the plurality of core cells is selectively driven as a recirculating core cell according to the moved optical signal,
   wherein at least one core cell among the plurality of core cells is connected to an input terminal and is driven as an input core cell to receive the optical signal input thereto, and
   wherein at least one core cell among the plurality of core cells is connected to an output terminal and is driven as an output core cell to output data about the optical signal.

3. The recirculating programmable photonic circuit of claim 1, wherein at least one core cell among the plurality of core cells is selectively driven as a recirculating core cell according to the moved optical signal,
   wherein the at least one core cell determines a path of the moved optical signal according to a size of an offset between the two first programmable waveguides of the programmable optical coupler.

4. The recirculating programmable photonic circuit of claim 3, wherein at least one core cell among the plurality of core cells determines that the path of the moved optical signal is in any one of a bar state, a partial coupling state, and a cross state according to the size of the offset.

5. The recirculating programmable photonic circuit of claim 1, wherein the programmable optical coupler includes a first programmable waveguide at one side of one core cell among the plurality of core cells and a first programmable waveguide at one side of another core cell among the plurality of core cells with a horizontal gap of a predetermined size formed therebetween,
   wherein a vertical offset between the two first programmable waveguides is controlled based on a vertical movement of one of the two first programmable waveguides, and
   wherein the optical coupling efficiency of the optical signal is controlled based on the controlled vertical offset.

6. The recirculating programmable photonic circuit of claim 5, wherein the programmable optical coupler adjusts the optical coupling efficiency of the optical signal, such that:
   when a size of the controlled vertical offset is greater than a reference size, the optical signal at the one side of the one core cell is transferred to another side; and
   when the size of the controlled vertical offset is less than the reference size, the optical signal at the one side of the one core cell is transferred to the one side of the other core cell.

7. The recirculating programmable photonic circuit of claim 6, wherein the size of the controlled vertical offset is 0 nm to 500 nm,
   wherein the reference size is 400 nm.

8. The recirculating programmable photonic circuit of claim 1, wherein the phase shifter includes the second programmable waveguide positioned on a lateral side of the first programmable waveguide at one side of one core cell among the plurality of core cells and approaching the lateral side along a horizontal axis.

9. The recirculating programmable photonic circuit of claim 8, wherein the phase shifter changes the phase of the optical signal by adjusting an effective refractive index of the optical signal according to a horizontal gap between the first programmable waveguide and the second programmable waveguide adjusted based on the horizontal movement of the second programmable waveguide.

10. The recirculating programmable photonic circuit of claim 9, wherein the phase shifter changes the phase of the optical signal in inverse proportion to a size of the adjusted horizontal gap.

11. The recirculating programmable photonic circuit of claim 1, wherein the plurality of core cells has any one cell structure among a square cell structure, a hexagonal cell structure, and a triangular cell structure based on the predetermined shape.

12. The recirculating programmable photonic circuit of claim 11, wherein, when one core cell among the plurality of core cells has the triangular cell structure, the one core cell includes one side on which the first programmable waveguides are controlled by the actuator and two sides on which the first programmable waveguides are not controlled by the actuator.

13. The recirculating programmable photonic circuit of claim 12, wherein the one side on which the first programmable waveguides are controlled and the two sides on which the first programmable waveguides are not controlled are selectively determined as a movement path of the optical signal based on control of the actuator.

14. A method of operating a recirculating programmable photonic circuit including a plurality of core cells each being connected to a programmable optical coupler including two first programmable waveguides and a phase shifter including a second programmable waveguide to form a predetermined shape, and an actuator electrically connected to one side of each of the plurality of core cells and configured to control a vertical movement of the first programmable waveguides and a horizontal movement of the second programmable waveguide, the method comprising:
   adjusting, by the programmable optical coupler, optical coupling efficiency of the optical signal based on the vertical movement of one of the two first programmable waveguides;
   changing, by the phase shifter, a phase of the optical signal based on the horizontal movement of the second programmable waveguide with respect to the first programmable waveguides; and selectively driving at least one core cell among the plurality of core cells by moving the optical signal from the predetermined shape according to the adjusted optical coupling efficiency and the changed phase in the plurality of core cells.

15. The method of claim 14, wherein the selective driving of the at least one core cell among the plurality of core cells comprises:

selectively driving at least one core cell among the plurality of core cells as a recirculating core cell according to the moved optical signal;

determining that a path of the moved optical signal is in any one state among a bar state, a partial coupling state, and a cross state according to a size of an offset between the two first programmable waveguides of the programmable optical coupler; and determining the path of the moved optical signal based on the determined state.

16. The method of claim 14, wherein the adjusting of the optical coupling efficiency of the optical signal based on the vertical movement of the one of the two first programmable waveguides comprises:

controlling a vertical offset between a first programmable waveguide at one side of one core cell among the plurality of core cells and a first programmable waveguide at one side of another other core cell among the plurality of core cells, based on a vertical movement of one of the first programmable waveguides arranged with a horizontal gap of a predetermined size formed therebetween; and adjusting the optical coupling efficiency of the optical signal based on the controlled vertical offset.

* * * * *